United States Patent
Pesetski et al.

(10) Patent No.: US 7,561,760 B2
(45) Date of Patent: Jul. 14, 2009

(54) SYSTEM AND METHOD FOR OPTICAL BEAM STEERING USING NANOWIRES AND METHOD OF FABRICATING SAME

(75) Inventors: Aaron Anthony Pesetski, Gamgrills, MD (US); Silai V. Krishnaswamy, Monroeville, PA (US)

(73) Assignee: Northrop Grumman Systems Corporation, Los Angeles, CA (US)

( * ) Notice: Subject to any disclaimer, the term of this patent is extended or adjusted under 35 U.S.C. 154(b) by 230 days.

(21) Appl. No.: 11/488,631

(22) Filed: Jul. 19, 2006

(65) Prior Publication Data

US 2009/0148095 A1    Jun. 11, 2009

(51) Int. Cl.
G02B 6/00 (2006.01)
G02F 1/01 (2006.01)
G02F 1/035 (2006.01)

(52) U.S. Cl. ............... 385/4; 385/3; 385/6; 385/8; 385/16

(58) Field of Classification Search ............... None
See application file for complete search history.

(56) References Cited

U.S. PATENT DOCUMENTS 6,737,939 B2 * 5/2004 Hoppe et al. ............... 333/186
7,115,306 B2 * 10/2006 Jeong et al. ............... 427/577
2002/0167375 A1 * 11/2002 Hoppe et al. ............... 333/186
2007/0081242 A1 * 4/2007 Kempa et al. ............... 359/486

FOREIGN PATENT DOCUMENTS

DE    102007033752 A1 *  3/2008

* cited by examiner

Primary Examiner—Michelle R Connelly Cushwa
(74) Attorney, Agent, or Firm—Andrew Kurth LLP

(57) ABSTRACT

An apparatus and a method for steering optical frequency beams using nanowire. A method includes providing one or more nanowire waveguide arrays, generating an optical frequency beam, wherein the optical frequency beam is incident on the one or more nanowire waveguide arrays, controlling the one or more nanowire waveguide arrays to produce a phase delay in the optical frequency beam as it traverses the nanowire waveguide array, wherein the phase delay causes the optical frequency beam to deflect upon exiting the one or more nanowire waveguide arrays, and steering the optical frequency beam exiting the one or more nanowire waveguide arrays by increasing or decreasing the phase delay, wherein the angle of deflection of the exiting optical frequency beam is determined by the amount of phase delay.

23 Claims, 10 Drawing Sheets

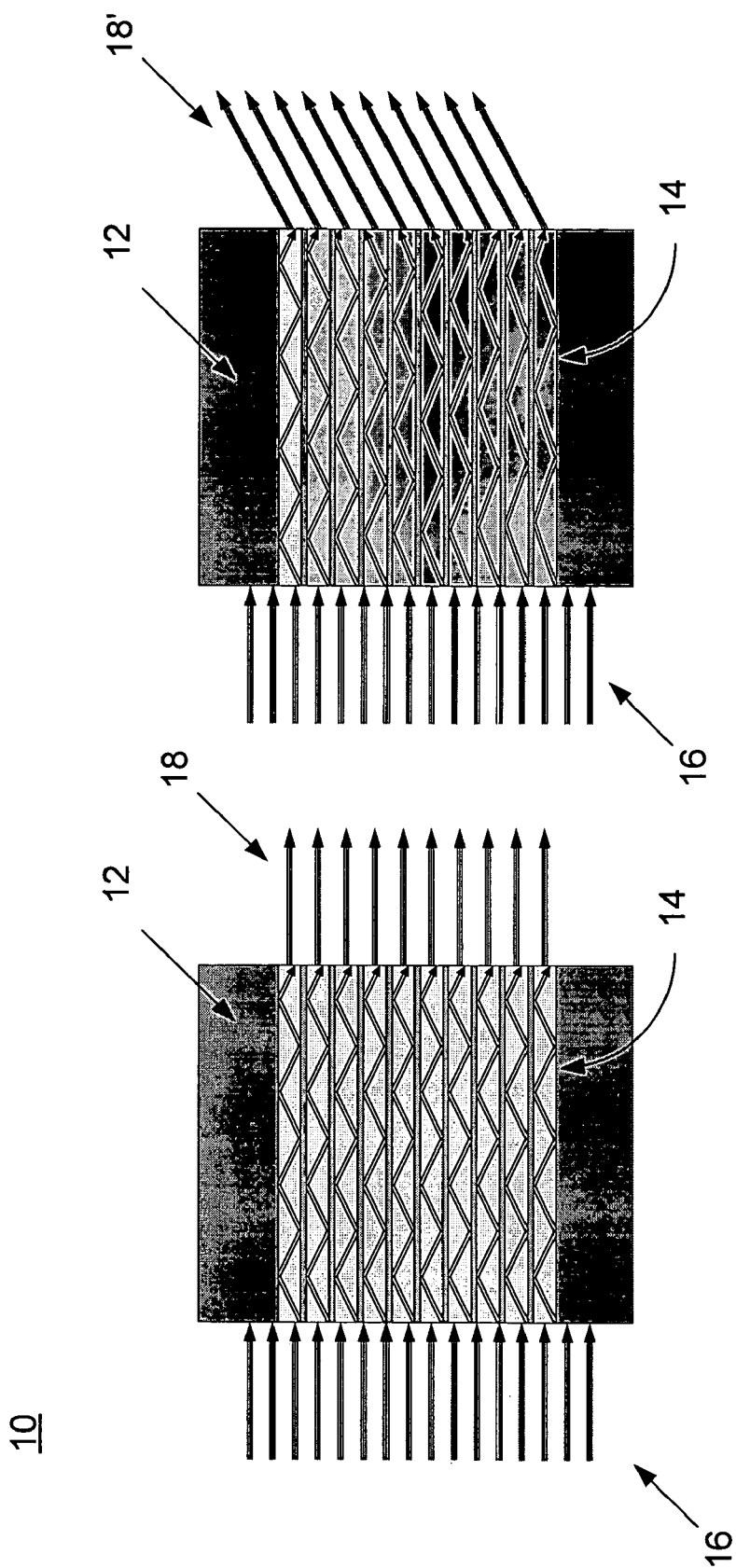

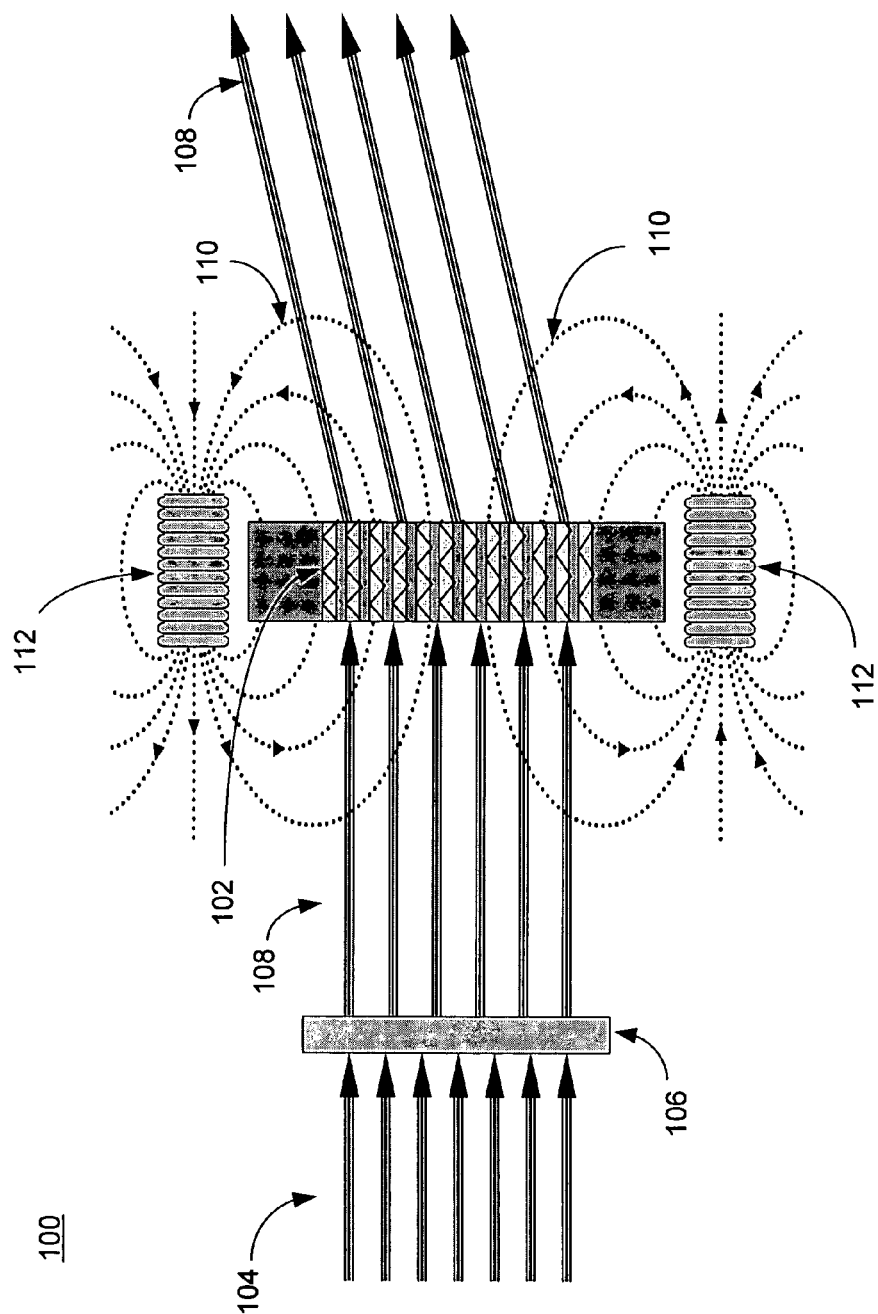

SYSTEM AND METHOD FOR OPTICAL BEAM STEERING USING NANOWIRES AND METHOD OF FABRICATING SAME

BACKGROUND

Recent advances in nanoscale technology have resulted in techniques for growing nanoscale wires ("nanowires") from a variety of materials including Gallium Nitride (GaN), Silicon (Si), Silicon Germanium (SiGe), Zinc Oxide (ZiO), Lead Zirconate Titanate (PZT), Cadmium Sulfide (CdS), Indium Phosphide (InP) and others. These nanowires have demonstrated many remarkable properties. Of particular interest is the ability to act as waveguides for optical frequency radiation.

Nanowires can be grown with diameters on the order of a few hundred nanometers. This allows them to act as waveguides for UV, visible and near IR light. One of the most common techniques used for the formation of nanowires, nanotubes, or nanorods is template-based synthesis in which the desired materials are grown within the pores of a porous membrane such as track-etched polycarbonate or anodic alumina. This method is widely used to form metal and polymer nanorods, semiconducting and oxide nanowires and composite structures. After the material is grown the template is removed to leave the desired nanowires.

SUMMARY

An advantage of the embodiments described herein is that they overcome the disadvantages of the prior art.

These advantages and others are achieved by a method for steering optical frequency beams using nanowire. A method includes providing one or more nanowire waveguide arrays, generating an optical frequency beam, wherein the optical frequency beam is incident on the one or more nanowire waveguide arrays, controlling the one or more nanowire waveguide arrays to produce a phase delay in the incident optical frequency beam, wherein the phase delay causes the optical frequency beam to deflect upon exiting the one or more nanowire waveguide arrays, and steering the optical frequency beam exiting the one or more nanowire waveguide arrays by increasing or decreasing the phase delay, wherein the angle of deflection of the exiting optical frequency beam is determined by the amount of phase delay.

These advantages and others are also achieved by method of making a nanowire waveguide array used for steering an optical frequency beam. The method includes forming a substrate, growing a layer of amorphous material on substrate, etching away low density regions in layer of amorphous material, creating inter-columnar spaces in amorphous material, filling in inter-columnar spaces with nanowire material, whereby nanowires are grown in the inter-columnar spaces, etching away remaining amorphous material, and optionally removing substrate.

These advantages and others are also achieved by a system for steering optical frequency beams using nanowire. The system includes two nanowire waveguide arrays configured in a Risley prism-like arrangement, coaxially aligned with each other, a light source that generates an optical frequency beam incident on a first of the two nanowire waveguide arrays and exits a second of the two nanowire waveguide arrays, and a mechanism for rotating the two nanowire waveguide arrays, wherein rotating the two nanowire waveguide arrays increases or decreases an angle of deflection of the exiting optical frequency beam.

These advantages and others are also achieved by a system for electrically steering optical frequency beams using nanowire. The system includes a nanowire waveguide array fabricated from an electro-optic material, in which the nanowire waveguide array includes one or more electrodes, a light source that generates an optical frequency beam incident on the nanowire waveguide array, and wherein an electric field is applied to the nanowire waveguide array, causing a phase delay in the optical frequency beam so that optical frequency beam exits the nanowire waveguide array with an angle of deflection, in which increasing the intensity of the electric field increases the angle of deflection.

These advantages and others are also achieved by a system for magnetically steering optical frequency beams using nanowire. The system includes a nanowire waveguide array fabricated from a magneto-optic material, a quarter-wave plate aligned parallel to nanowire waveguide array, a light source that generates an optical frequency beam incident on the quarter-wave plate, wherein quarter-wave plate produces circularly polarized light beam that is incident on nanowire waveguide array, and a mechanism for applying a magnetic field to the nanowire waveguide array, wherein applied magnetic field causes a phase delay in the circularly polarized light beam so that circularly polarized light beam exits the nanowire waveguide array with an angle of deflection, in which increasing the magnetic field gradient increases the angle of deflection and the circularly polarized light beam is deflected in the direction of the magnetic field gradient.

DESCRIPTION OF THE DRAWINGS

The detailed description will refer to the following drawings, wherein like numerals refer to like elements, and wherein:

FIGS. 1A-1B are a schematic diagram illustrating an embodiment of a system for steering a beam using nanowire;

FIG. 7A is a schematic diagram illustrating an embodiment of a system for magnetically steering an optical beam using a nanowire array.

DETAILED DESCRIPTION

Figure 2A:
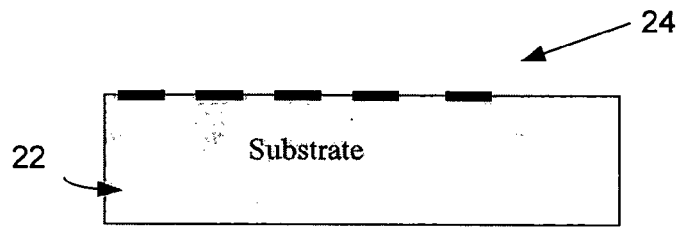
FIGS. 2A-2E are schematic diagrams graphically illustrating various steps of an embodiment of a method of forming a nanowire array.

Described herein are systems and methods for steering optical frequency beams (optical beams) using nanowires and a method of making such systems. Embodiments include methods of steering an optical beam using an array of nanowire waveguides. A first embodiment uses a nanowire array that has been doped to form a structure similar to a diffraction grating. The structure is then rotated mechanically to steer the beam. A second embodiment uses nanowires made from an electro-optic material such as GaN, allowing the beam to be steered electronically. A third embodiment uses the Faraday effect to steer the beam magnetically.

Because of their small size, nanowire waveguides can form an array with spacing less than the wavelength of the light being transmitted. The surface of an array of waveguides is essentially an antenna array. If the light traversing the nanowires is phase coherent, the light will emerge from the array to form a beam.

With reference now to FIGS. 1A-1B, shown is a schematic illustrating system 10 for steering a beam using nanowire array 12. Applying a phase delay that is linearly increasing across the face of the array will cause the beam to steer to the side. Individual nanowires (or nanotubes or nanorods) 14 in array 12 act as waveguides for light (optical frequency radiation) 16. When nanowire array 12 is illuminated with a phase coherent source such as a laser (from left-side), light 16 propagates down individual nanowires 14 and is reemitted. The end of each nanowire waveguide 14 acts like an independent light source. For points well away from the face of the array, the light from each individual source can add constructively or destructively. If the light from each source is emitted with the same phase, the sources will only add constructively for points perpendicular to the face of the nanowire array. Light will thus be emitted as a beam 18 perpendicular to the face of the array, as shown in FIG. 1A. If however each waveguide applies a different phase delay to the light propagating down the waveguide and the phase delays are arranged such that the phase shift increases linearly across the face of the array, the light sources will only add coherently at points which lie along a line at an angle to the face of the array. That is, the beam 18' emitted by the array will be deflected (steered) away from the perpendicular, as shown in FIG. 1B. The amount of deflection is directly proportional to the gradient of the phase shift across the face of the array. Thus increasing the gradient of the phase shift will increase the angle of deflection.

According to the embodiments described herein, the linearly increasing phase delay can be achieved by changing the index of refraction of the material such as by doping or through the electro-optic effect. Likewise, according to the embodiments described herein, the linearly increasing phase delay can also be achieved for circularly polarized light using the Faraday (magneto-optic) effect.

Embodiments described herein use GaN nanowires to make the waveguide array. GaN is known to form nanowires that can act as optical waveguides. In addition, GaN has been reported to exhibit both electro-optic and Faraday effects. However, other materials, such as Barium Titanate (BaTiO3), Strontium-Barium Niobate ($Sr_xBa_{(1-x)}Nb_2O_6$) SBN, PZT, PLZT, SiGe, $KH_2PO_4$ (KDP), $LiNbO_3$, etc., may also be used. In embodiments described herein, the material should be capable of (a) forming nanowires of a substance that is transparent at the operating frequency that can act as optical waveguides and (b) 1) being doped to change the index of refraction, 2) exhibiting the electro-optic effect, and/or 3) exhibiting the Faraday effect.

Manufacture of Nanowire Arrays

As discussed above, one of the most common techniques used for the formation of nanowires, nanotubes, or nanorods is template-based synthesis in which the desired materials are grown within the pores of a porous membrane such as track-etched polycarbonate or anodic alumina. With reference to FIGS. 2A-2E, described herein is a method of forming a nanowire array. Method is based on the fact that thin films, particularly films grown by physical vapor deposition, have three levels (macro, micro and nano) of columnar microstructure with low-density regions filling the inter-columnar space. The macro columns are a few microns in diameter, the micro columns a few thousand angstroms, and the nano columns are a few nanometers. With reference to FIG. 3, three levels of microstructure in an amorphous germanium (a-Ge) film are shown. The a-Ge film was etched in $H_2O_2$ to remove the low-density regions and clearly reveal the different columnar structure levels. A similar observation was made with amorphous silicon (a-Si) films, also shown in FIG. 3.

Figure 2B:
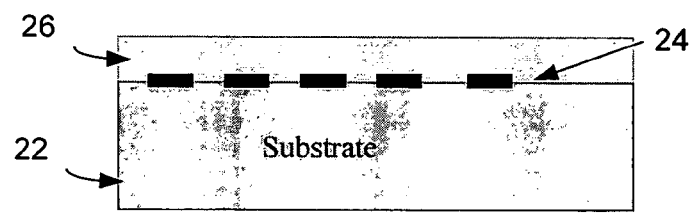
Figure 2C:
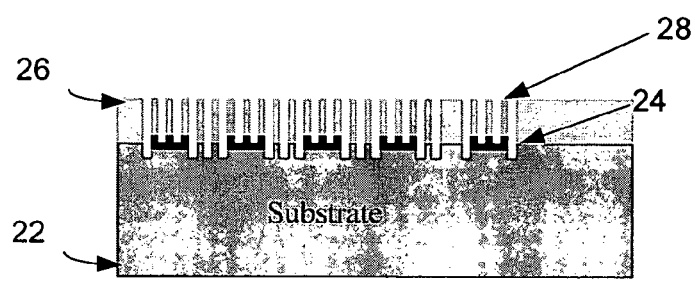
Figure 2D:
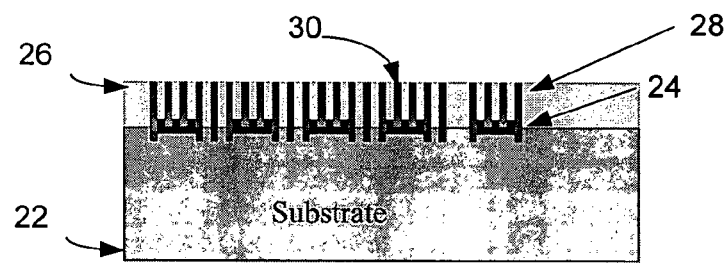
Figure 2E:
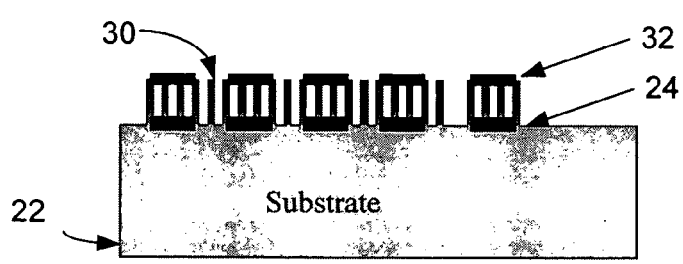
Figure 3:
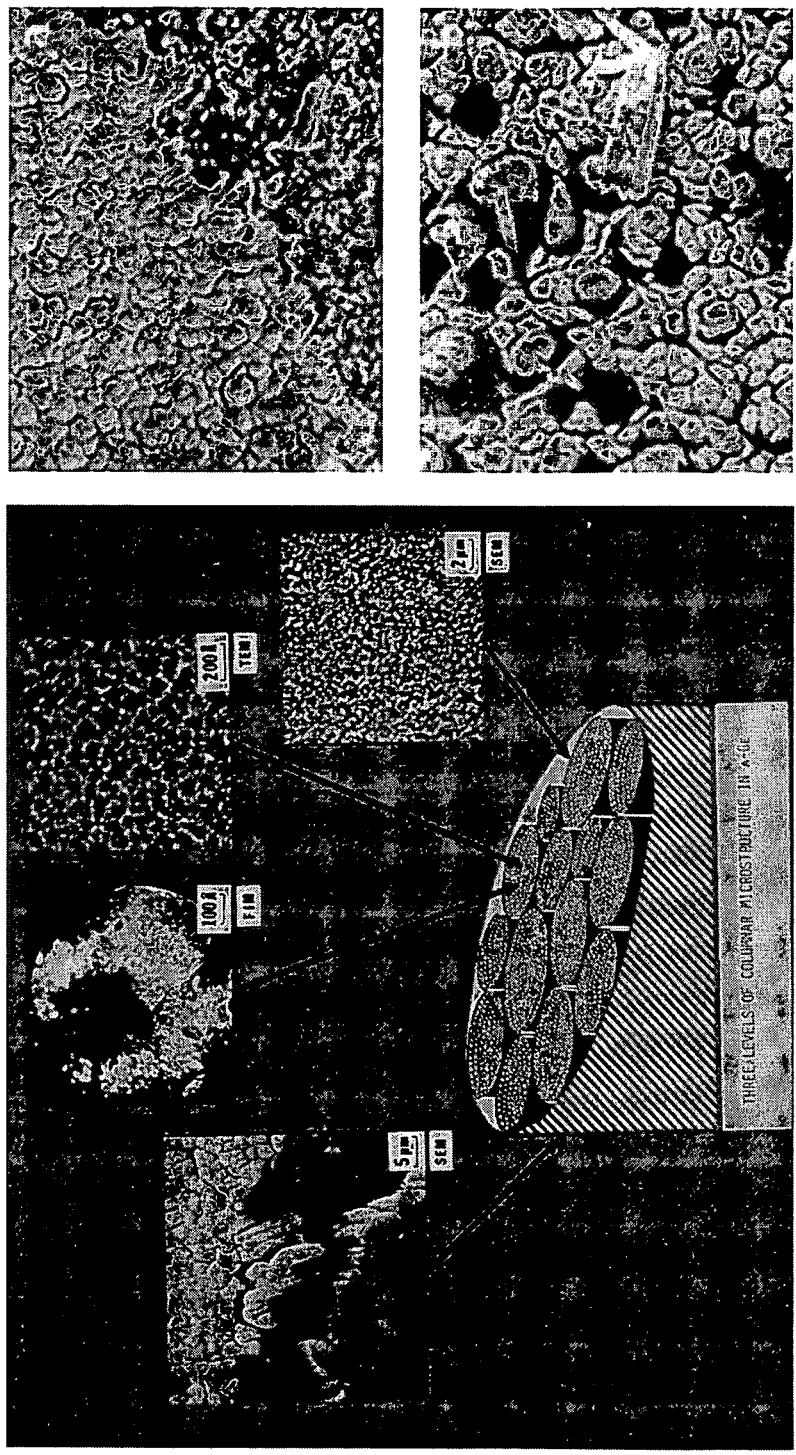
FIG. 3 is photographs illustrating levels of microstructure in amorphous germanium and amorphous silicon.

With reference now to FIG. 2A, substrate 22 is formed. Substrate 22 may be formed with bottom electrodes 24 for certain electronic steering embodiments. Substrate 22 may be formed from nearly any material, examples including silicon, sapphire, GaAs, quartz, and others. A layer or film 26 of a-Si or a-Ge is grown on substrate 22, as shown in FIG. 2B. Low density regions in film 26 are identified and etched away (or otherwise removed), as shown in FIG. 2C. This creates the inter-columnar spaces or regions 28 described above. Inter-columnar regions 28 are then filled with the desired material (e.g., GaN, ZnSe, ZnTe, KTN, $LiNbO_3$, $LiTaO_3$, $KNbO_3$, or ZnGeP2, CdGeP2, or a rare earth iron garnate in which the rare earth metal may be T, Y, Gd, Tb, Dy, or Yb) for growing nanowires 30, and nanowires 30 are grown, as shown in FIG. 2D. Then, top electrodes 32 are optionally deposited and the remaining a-Si or a-Ge is etched away, leaving only nanowire waveguide array 34, as shown in FIG. 2E. An advantage of this technique is that the inter-columnar spacing can be changed by varying the deposition conditions. Further, certain deposition conditions allow the columns to grow tilted permitting the nanowires to be grown at an angle if necessary.

Figure 4:
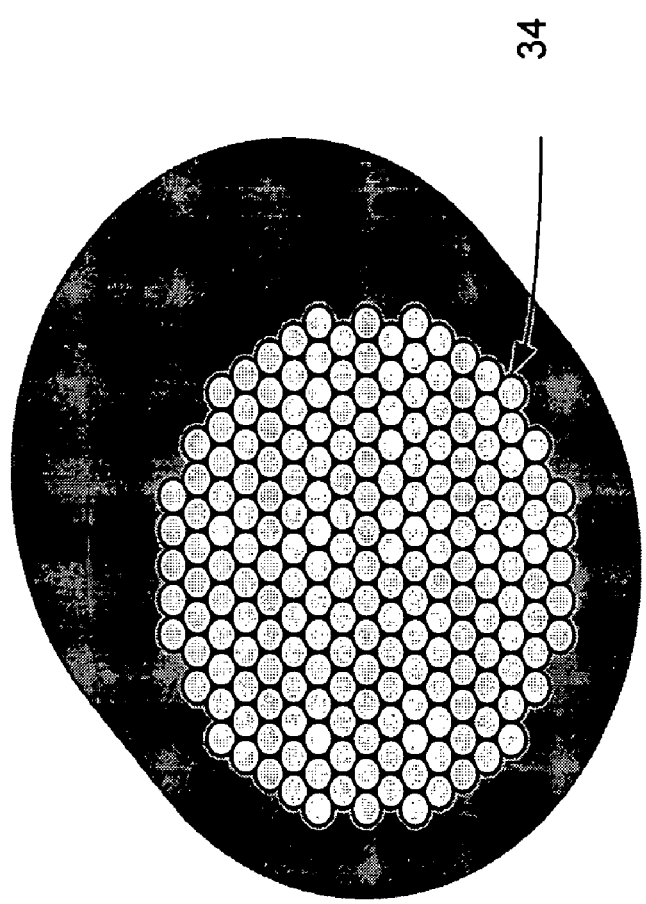
FIG. 4 is a schematic diagram illustrating a nanowire array made using an embodiment of a method of forming a nanowire array.

Once nanowires 30 have been grown, the space between and around nanowires 30 can be filled to form a rigid structure. A variety of different materials exist which may be used for this purpose. The materials used should have a proper index of refraction to keep the optical radiation confined to the waveguide, not cause excessive optical losses, and be rigid enough to securely hold the nanowire waveguide array 34 in place during further processing. In certain embodiments, spaces between nanowires 30 may be filled with electrodes in order to provide for electrical steering of beam (see below). Once the space between nanowires 30 is filled, substrate 22 may be ground off and the top and bottom surfaces of nanowire waveguide array 34 polished. Optionally, the substrate need not be removed if it is made from a transparent material with the proper optical properties. This process may yield a nanowire waveguide array 34 similar to that depicted in FIG. 4.

Mechanically Steered Array

Figure 5A:
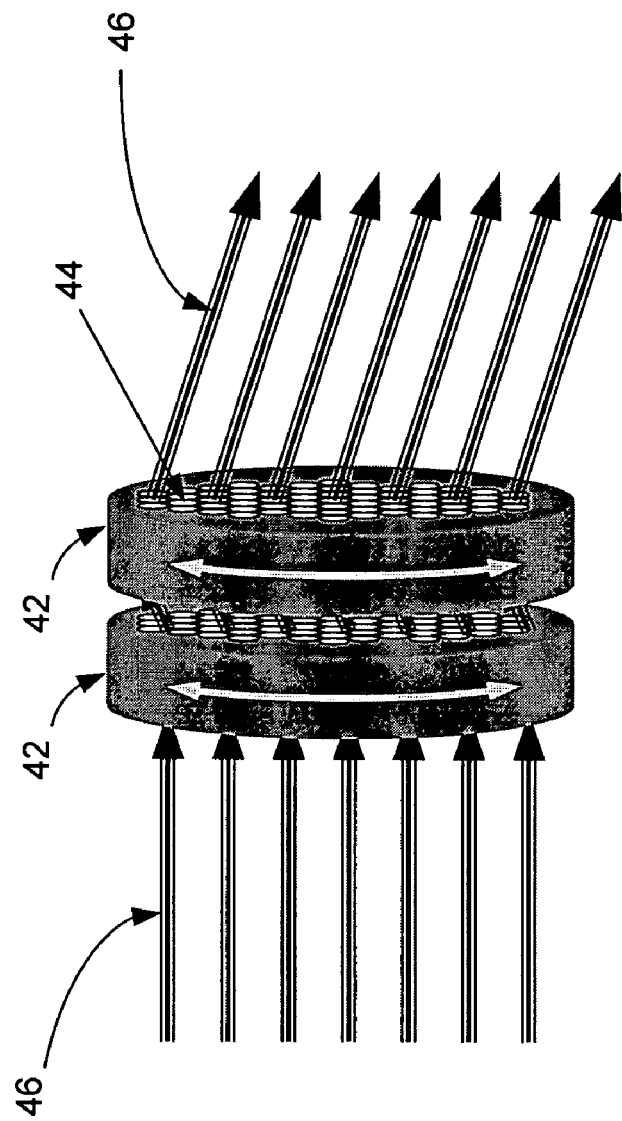
FIG. 5A is a schematic diagram illustrating an embodiment of a system for mechanically steering an optical beam using a nanowire array.
Figure 5B:
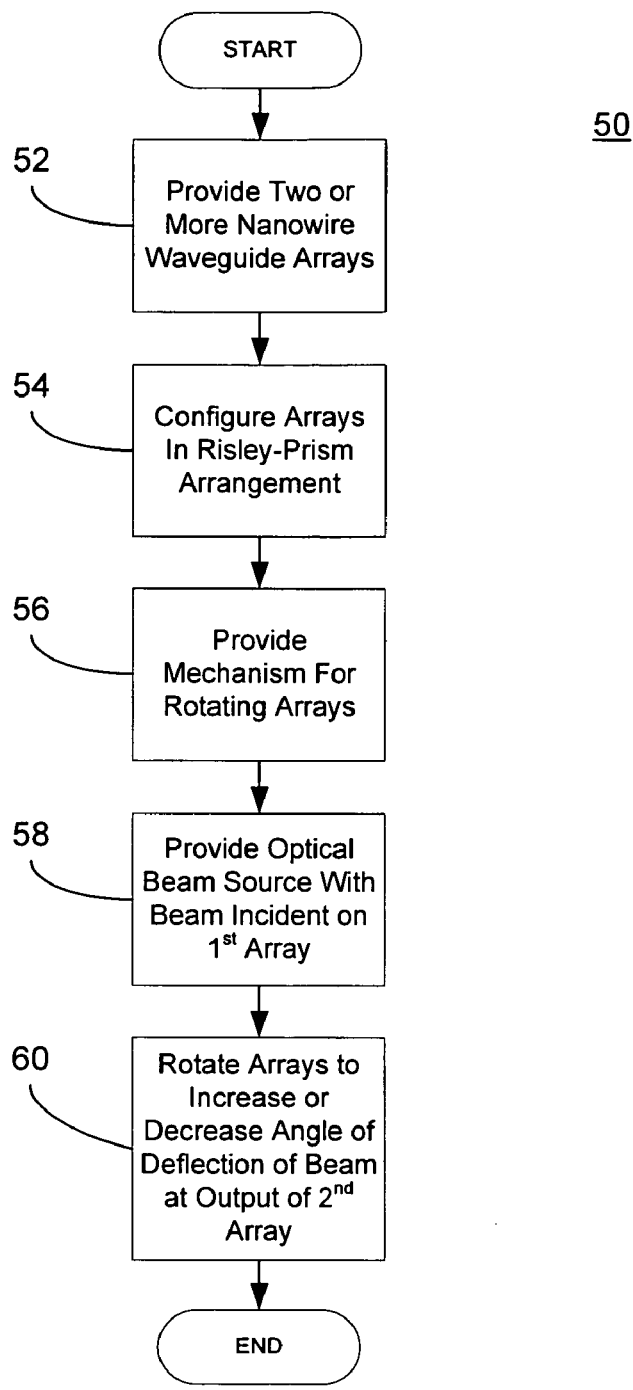
FIG. 5B is a flowchart illustrating an embodiment of a method for mechanically steering an optical beam using a nanowire array.

With reference now to FIGS. 5A-5B, shown are system 40 and method 50 for mechanically steering an optical beam using a nanowire array. The simplest way to use a nanowire array to steer an optical beam is mechanical steering. In the embodiment shown, two nanowire waveguide arrays 42 are configured similar to a Risley prism. Individual nanowires 44 in arrays 42 may be doped to change their index of refraction. Linearly increasing the dopant concentration across nanowire waveguide array 42 will cause a linear increase in the index of refraction of nanowires 44. This will result in a linear increase in the phase delay experienced by the light propagating through each waveguide 42. Since the light emitted from the surface of nanowire waveguide array 42 will have a linearly increasing phase delay, the resulting beam will steer in the direction opposite the dopant gradient.

Nanowire waveguide arrays 42 are mechanically rotated independently to steer beam 46. System 40 provides for maximum beam deflection when nanowire waveguide arrays 42 are aligned coaxially with a small gap between them, as shown in FIG. 5A. Nanowire waveguide arrays 42 may be rotated mechanically, using known mechanisms such as a stepper motor, to achieve steering. When the doping gradients are aligned (i.e., dopant gradients are parallel), phase delay in beam 46 is greatest and beam 46 experiences maximum deflection (greatest angle of deflection). When the dopant gradients are anti-parallel, the phase delay is minimized and beam 46 will be un-deflected. System 40 may be configured with additional nanowire waveguide arrays 42 to provide additional steering options and flexibility. For example, a third nanowire waveguide array 42 may enable the angle of deflection to be further increased.

With reference to FIG. 5B, method 50 includes providing two or more nanowire waveguide arrays 42 (block 52). Nanowire waveguide arrays 42 may be manufactured as described above with reference to FIGS. 2A-2E. Nanowire waveguide arrays 42 are preferably doped with increasing dopant concentration across each nanowire waveguide array 42. Nanowire waveguide arrays 42 are configured similar to a Risley-prism configuration (block 54). A mechanism(s) for rotating nanowire waveguide arrays 42 is provided (block 56). An optical beam source is provided, with light beam 46 incident on first nanowire waveguide array 42 (block 58). Optical beam source may be, for example, a laser, a laser diode, or an incoherent monochromatic source. Nanowire waveguide arrays 42 are rotated to increase or decrease the phase delay and, hence, the resulting angle of deflection of beam 46 at output from second (or last) nanowire waveguide array 42 (block 60). One nanowire waveguide array 42 may be rotated while the other remains stationary or both nanowire waveguide arrays 42 may be rotated.

Electrically Steered Array

Figure 6A:
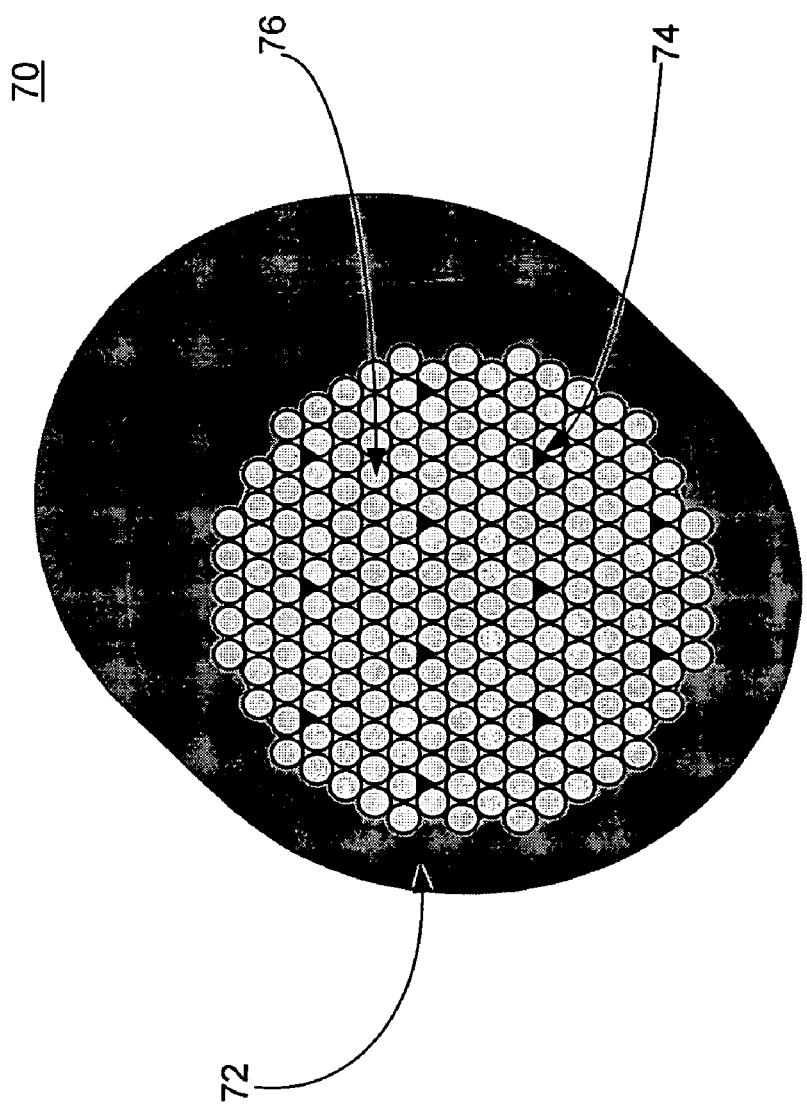
FIG. 6A is a schematic diagram illustrating an embodiment of a system for electronically steering an optical beam using a nanowire array.
Figure 6B:
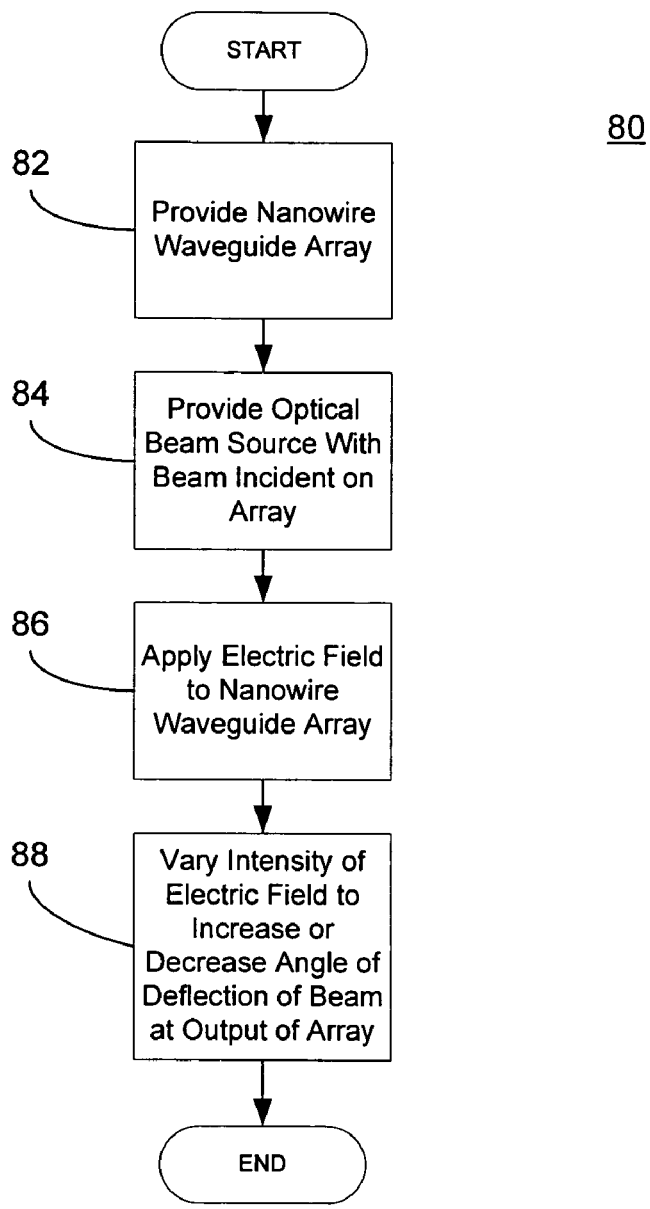
FIG. 6B is a flowchart illustrating an embodiment of a method for electronically steering an optical beam using a nanowire array.

With reference now to FIGS. 6A-6B, shown are system 70 and method 80 for electrically steering an optical beam using a nanowire array. Electrical steering is generally much faster than mechanical steering, but electrically steered nanowire waveguide array 72 is generally more difficult to fabricate. The index of refraction (and thus phase delay) of nanowire waveguide array 72 made from electro-optic material can be modulated with an applied electric field. Generating the electric field using electrodes 74 in channels between nanowires 76 in nanowire waveguide array 72 permits a large beam deflection with a small applied voltage. Alternatively, electrodes could be deposited on top or bottom surface of nanotube array (not shown).

With reference to FIG. 6A, nanowires 76 are constructed from an electro-optic material (e.g., GaN, ZnSe, ZnTe, KTN, LiNbO$_3$, LiTaO$_3$, KNbO$_3$). When an electric field is placed across the nanowire waveguide array 72, the index of refraction of nanowires 76 increases, slowing optical beam (not shown) and increasing the phase delay. Increasing the phase delay increases the angle of deflection of the optical beam. Beam can be steered by varying the intensity of the electric field across the face of nanowire waveguide array 72.

Electrodes 74 used to produce the electric field may be placed either on the top and bottom surfaces of nanowire waveguide array 72 (as described above with regards to FIGS. 2A-2E) or in channels between the individual nanowires 76, as shown in FIG. 6A. Placing electrodes 74 on the top and bottom surfaces is easier to fabricate, but the large separation between electrodes 74 limits the size of the electric field and thus the maximum beam deflection. Depositing electrodes 74 in the channels between nanowires 76 is more difficult to fabricate, but allow nanowire waveguide array 72 to achieve large deflection angles with low voltages.

With reference to FIG. 6B, method 80 includes providing an electrically steered nanowire waveguide array 72 (block 82). Nanowire waveguide array 72 may be manufactured as described above with reference to FIGS. 2A-2E. Nanowire waveguide arrays 72 may include top and bottom electrodes 74 or electrodes 74 deposited in the channels between nanowires 76. An optical beam source is provided, with light beam incident on nanowire waveguide array 72 (block 84). An electric field is applied to the nanowire waveguide array 72 (block 86), increasing the index of refraction of nanowires 76 and the phase delay in beam. An electric field may be applied to nanowire waveguide array 72 through a power source connected to electrodes (e.g., via wires or other known means). Intensity of applied electric field may be varied to increase or decrease the index of refraction and, hence, the phase delay and resulting angle of deflection of beam, thereby steering the beam (block 88).

Magnetically Steered Array

Figure 7B:
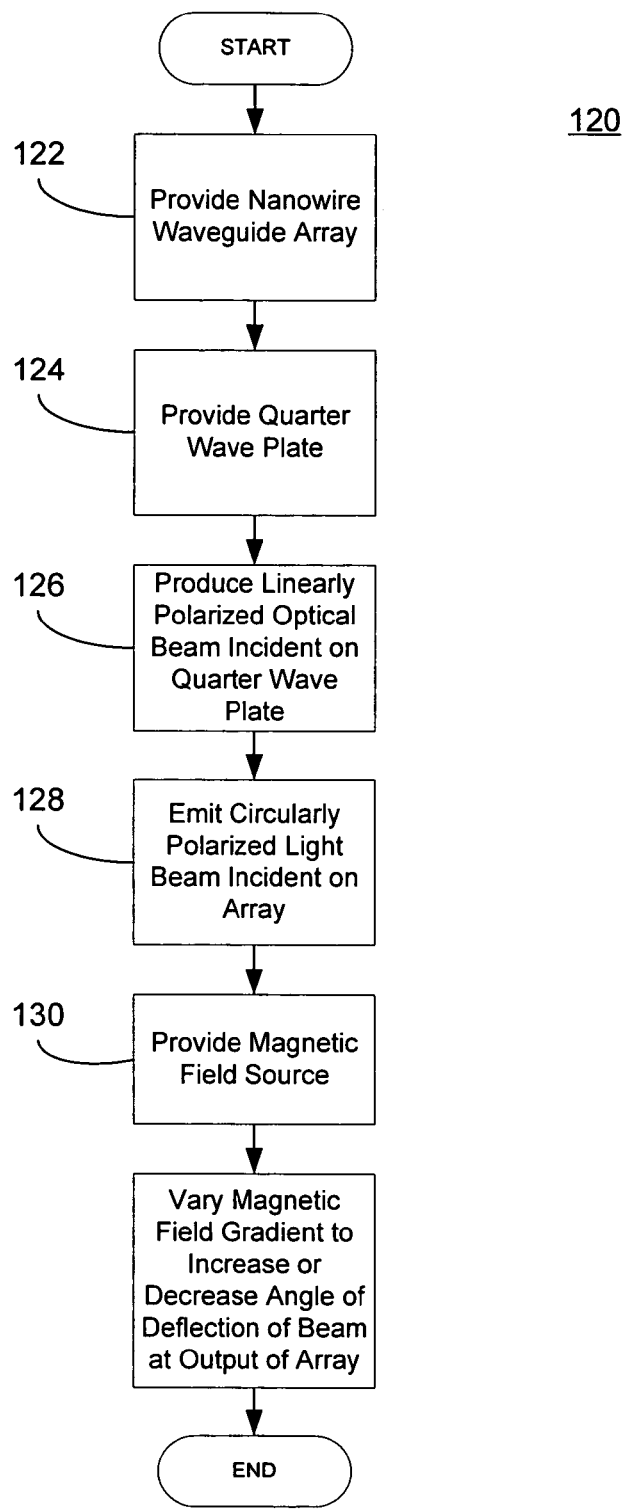
FIG. 7B is a flowchart illustrating an embodiment of a method for magnetically steering an optical beam using a nanowire array.

With reference now to FIGS. 7A-7B, shown are system 100 and method 120 for magnetically steering an optical beam using a nanowire array. System 100 and method 120 use the Faraday effect to steer the beam magnetically. The Faraday effect is a rotation of the plane of polarization of light passing through a magneto-optic medium in the presence of a magnetic field. For certain materials, the plane of polarization of a beam of light passing through the material is rotated when a magnetic field is applied parallel to the beam. The degree of rotation is proportional to the applied field.

FIG. 7A shows a schematic of magneto-optic nanowire waveguide array 102 using the Faraday effect for beam steering. Linearly polarized beam 104 (e.g., laser beam 104) passes through quarter wave plate 106, producing circularly polarized light beam 108. Quarter wave plate 108 are commercially available optics components. Circularly polarized light beam 108 then passes through nanowire waveguide array 102. Nanowire waveguide array 102 is fabricated from a magneto-optic material. If magnetic field 110 is applied to nanowire waveguide array 102, magnetic field 110 will rotate the plane of polarization of polarized light beam 108. For circularly polarized beam 108, rotating the plane of polarization is equivalent to a phase shift. The phase shift produces an effective phase delay in circularly polarized beam 108, deflecting circularly polarized beam 108. The greater the phase shift, and hence phase delay, the greater the angle of deflection of circularly polarized beam 108.

Magnetic field 110 may be generated, e.g., using a pair of counter-wound coils 112. Power supply(ies) (not shown) may be connected to counter-wound coils 112 to provide necessary power and control to for counter-wound coils 112 to produce and control magnetic field 110. Counter-wound coils 112 produce magnetic field 110 with a gradient in magnetic field 110 across the face of nanowire waveguide array 102. The resulting gradient in the phase (the phase shift or delay) of polarized light beam 108 emitted from nanowire waveguide array 102 will cause polarized light beam 108 to steer in the direction of the magnetic field gradient. The greater the magnetic field gradient across nanowire waveguide array 102, the greater gradient in the phase of polarized light beam 108 and, hence, the greater degree of deflection of polarized light beam 108 emitted from nanowire waveguide array 102.

With reference to FIG. 7B, method 120 includes providing magnetically steered nanowire waveguide array 102 (block 122). Nanowire waveguide array 102 is fabricated from magneto-optic material and may be manufactured as described above with reference to FIGS. 2A-2E. Quarter wave plate 106 is provided and configured parallel to nanowire waveguide array 102 with an appropriate space between, as illustrated in FIG. 7A (block 124). A linearly polarized optical beam source, such as a laser, is provided, producing linearly polarized light beam 104 incident on quarter wave plate 106 (block 126). Circularly polarized light beam 108 incident on nanowire waveguide array 102 is emitted from quarter wave plate 106 (block 128). Magnetic field source(s), such as counter-wound coils 112, is provided (block 130). Magnetic field 110 is applied to nanowire waveguide array 102 by magnetic field source (block 132), increasing the phase shift or delay of polarized light beam 108 emitted by nanowire waveguide array 102. Magnetic field 110 gradient may be varied to increase or decrease the phase shift or delay, thereby increasing or decreasing angle of deflection of polarized light beam 108 emitted by nanowire waveguide array 102, thereby steering polarized light beam 108 in direction of magnetic field gradient (block 134).

The description above with regards to FIGS. 1A and 1B explains how phase delay causes the output beam to steer. The same mechanism is involved in mechanically, electrically and magnetically steered arrays. The difference between these embodiments is in how the phase delay is generated.

The terms and descriptions used herein are set forth by way of illustration only and are not meant as limitations. Those skilled in the art will recognize that many variations are possible within the spirit and scope of the invention as defined in the following claims, and their equivalents, in which all terms are to be understood in their broadest possible sense unless otherwise indicated.

The invention claimed is:

1. A method for steering optical frequency beams using nanowire, comprising:
    providing one or more nanowire waveguide arrays;
    generating an optical frequency beam, wherein the optical frequency beam is incident on the one or more nanowire waveguide arrays;
    controlling the one or more nanowire waveguide arrays to produce a phase delay in the optical frequency beam as it travels through nanowire waveguide array, wherein the phase delay causes the optical frequency beam to deflect upon exiting the one or more nanowire waveguide arrays; and
    steering the optical frequency beam exiting the one or more nanowire waveguide arrays by increasing or decreasing the phase delay, wherein the angle of deflection of the exiting optical frequency beam is determined by the gradient of the phase delay.

2. The method of claim 1 further comprising providing a light source, in which the optical frequency beam is generated by the light source.

3. The method of claim 1 in which the providing provides two nanowire waveguide arrays.

4. The method of claim 3 further comprising configuring the two nanowire waveguide arrays in a Risley prism-like arrangement in which the generated optical frequency beam is incident on a first of the two nanowire waveguide arrays and the exiting optical frequency beam exits a second of the two nanowire waveguide arrays.

5. The method of claim 3 in which the controlling and steering are performed by rotating the two nanowire waveguide arrays in relationship to each other.

6. The method of claim 3 in which each nanowire waveguide array is doped with increasing dopant concentration across each nanowire waveguide array.

7. The method of claim 6 in which maximum angle of deflection of the exiting optical frequency beam is achieved when doping gradients in each nanowire waveguide array are aligned.

8. The method of claim 3 in which the nanowire waveguide arrays are coaxially aligned.

9. The method of claim 1 in which the providing provides a nanowire waveguide array that includes electrodes.

10. The method of claim 9 in which the electrodes are deposited in channels between individual nanowires in nanowire waveguide array.

11. The method of claim 1 in which the controlling comprises applying an electric field to nanowire waveguide array.

12. The method of claim 11 in which the steering comprises increasing or decreasing the electric field applied to the nanowire waveguide array.

13. The method of claim 1 in which the providing provides a nanowire waveguide array fabricated from an electro-optic material.

14. The method of claim 1 in which the providing provides a nanowire waveguide array fabricated from magneto-optic material.

15. The method of claim 1 in which the steering uses the Faraday effect.

16. The method of claim 1 further comprising providing a quarter wave plate, wherein generated optical frequency beam passes through quarter wave plate and exits quarter wave plate as circularly polarized light beam.

17. The method of claim 1 in which generated optical frequency beam is a circularly polarized light beam and controlling comprises applying a magnetic field to rotate the plane of polarization of circularly polarized light beam.

18. The method of claim 17 in which steering comprises increasing or decreasing magnetic field gradient, wherein angle of deflection of exiting optical frequency beam is increased or decreased and exiting optical frequency beam is deflected in direction of magnetic field gradient.

19. The method of claim 17 in which applying a magnetic field comprises providing one or more counter-wound coils surrounding nanowire waveguide array.

20. A system for steering optical frequency beams using nanowire, comprising:
    two nanowire waveguide arrays configured in a Risley prism-like arrangement, coaxially aligned with each other;
    a light source that generates an optical frequency beam incident on a first of the two nanowire waveguide arrays and exits a second of the two nanowire waveguide arrays; and
    a mechanism for rotating the two nanowire waveguide arrays, wherein rotating the two nanowire waveguide arrays increases or decreases an angle of deflection of the exiting optical frequency beam.

21. The system of claim 20 in which each nanowire waveguide array is doped with increasing dopant concentration across each nanowire waveguide array.

22. A system for electrically steering optical frequency beams using nanowire, comprising:
    a nanowire waveguide array fabricated from an electro-optic material, in which the nanowire waveguide array includes one or more electrodes;

a light source that generates an optical frequency beam incident on the nanowire waveguide array; and wherein an electric field is applied to the nanowire waveguide array, causing a phase delay in the optical frequency beam so that optical frequency beam exits the nanowire waveguide array with an angle of deflection, in which increasing the intensity of the electric field increases the angle of deflection.

23. A system for magnetically steering optical frequency beams using nanowire, comprising:

a nanowire waveguide array fabricated from a magneto-optic material;

a quarter-wave plate aligned parallel to nanowire waveguide array;

a light source that generates an optical frequency beam incident on the quarter-wave plate, wherein quarter-wave plate produces circularly polarized light beam that is incident on nanowire waveguide array; and a mechanism for applying a magnetic field to the nanowire waveguide array, wherein applied magnetic field causes a phase delay in the circularly polarized light beam so that circularly polarized light beam exits the nanowire waveguide array with an angle of deflection, in which increasing the magnetic field gradient increases the angle of deflection and the circularly polarized light beam is deflected in the direction of the magnetic field gradient.

* * * * *